United States Patent
Bell, Jr. et al.

(10) Patent No.: US 8,713,287 B2
(45) Date of Patent: *Apr. 29, 2014

(54) OFF-LOADING OF PROCESSING FROM A PROCESSOR BLADE TO STORAGE BLADES BASED ON PROCESSING ACTIVITY, AVAILABILITY OF CACHE, AND OTHER STATUS INDICATORS

(71) Applicant: International Business Machines Corporation, Armonk, NY (US)

(72) Inventors: Robert H. Bell, Jr., Austin, TX (US); Jose R. Escalera, Austin, TX (US); Octavian F. Herescu, Austin, TX (US); Vernon W. Miller, Tuscon, AZ (US); Sergio Reyes, Cedar Park, TX (US); Michael D. Roll, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,247

(22) Filed: Nov. 30, 2012

(65) Prior Publication Data

US 2013/0091509 A1 Apr. 11, 2013

Related U.S. Application Data

(63) Continuation of application No. 12/356,030, filed on Jan. 19, 2009, now Pat. No. 8,352,710.

(51) Int. Cl.
G06F 9/00 (2006.01)
(52) U.S. Cl.
USPC .................................. 712/28; 710/5

(58) Field of Classification Search
None
See application file for complete search history.

(56) References Cited

U.S. PATENT DOCUMENTS

| | | | |
|---|---|---|---|
| 4,715,013 A | 12/1987 | MacGregor et al. | |
| 4,956,771 A | 9/1990 | Nuestaedter | |
| 5,042,000 A | 8/1991 | Baldwin | |
| 6,098,064 A * | 8/2000 | Pirolli et al. | 1/1 |
| 6,185,659 B1 * | 2/2001 | Milillo et al. | 711/137 |
| 6,275,867 B1 | 8/2001 | Bendert et al. | |
| 6,789,147 B1 | 9/2004 | Kessler et al. | |
| 6,941,386 B2 | 9/2005 | Craft et al. | |

(Continued)

FOREIGN PATENT DOCUMENTS

JP  2005050131 A  *  2/2005  ............ G06F 15/177

OTHER PUBLICATIONS

First Office Action dated Mar. 29, 2012, pp. 1-16, for U.S. Appl. No. 12/356,030 by inventors R.H. Bell, Jr., et al. (18.327).

(Continued)

*Primary Examiner* — David J Huisman
(74) *Attorney, Agent, or Firm* — Konrad Raynes Davda & Victor LLP; Rabindranath Dutta

(57) ABSTRACT

A processor blade determines whether a selected processing task is to be off-loaded to a storage blade for processing. The selected processing task is off-loaded to the storage blade via a planar bus communication path, in response to determining that the selected processing task is to be off-loaded to the storage blade. The off-loaded selected processing task is processed in the storage blade. The storage blade communicates the results of the processing of the off-loaded selected processing task to the processor blade.

16 Claims, 5 Drawing Sheets

(56) References Cited

U.S. PATENT DOCUMENTS

| | | |
|---|---|---|
| 7,240,188 B2 | 7/2007 | Takata et al. |
| 7,437,535 B1 | 10/2008 | Joffe et al. |
| 7,543,109 B1 | 6/2009 | Bell et al. |
| 7,711,871 B1 | 5/2010 | Haechten et al. |
| 7,716,286 B2 | 5/2010 | Heins et al. |
| 2004/0148420 A1 | 7/2004 | Hinshaw et al. |
| 2005/0033938 A1* | 2/2005 | Davis et al. ............... 712/34 |
| 2006/0036878 A1 | 2/2006 | Rothman et al. |
| 2006/0095595 A1 | 5/2006 | Dalton et al. |
| 2006/0095754 A1 | 5/2006 | Hyder et al. |
| 2006/0190484 A1 | 8/2006 | Cromer et al. |
| 2007/0083861 A1 | 4/2007 | Becker et al. |
| 2007/0130356 A1 | 6/2007 | Boucher et al. |
| 2007/0226745 A1 | 9/2007 | Haas et al. |
| 2008/0016374 A1 | 1/2008 | Gee et al. |
| 2008/0045161 A1 | 2/2008 | Lee et al. |
| 2010/0186018 A1 | 7/2010 | Bell et al. |

OTHER PUBLICATIONS

Response dated Jun. 29, 2012, pp. 1-12, for U.S. Appl. No. 12/356,030 by inventors R.H. Bell, Jr., et al. (18.327).

Notice of Allowance dated dated Aug. 31, 2012, pp. 1-14, for U.S. Appl. No. 12/356,030 by inventors R.H. Bell, Jr., et al. (18.327).

* cited by examiner

OFF-LOADING OF PROCESSING FROM A PROCESSOR BLADE TO STORAGE BLADES BASED ON PROCESSING ACTIVITY, AVAILABILITY OF CACHE, AND OTHER STATUS INDICATORS

CROSS-REFERENCE TO RELATED APPLICATIONS

This application is a continuation of application Ser. No. 12/356,030 (U.S. Pat. No. 8,352,710) filed on Jan. 19, 2009, which is incorporated herein by reference in its entirety.

BACKGROUND

1. Field

The disclosure relates to a method, a system, and an article of manufacture for the off-loading of processing from a processor blade to storage blades.

2. Background

A blade system is a computational device in which a plurality of blade computational devices may be included. The blade system includes a blade enclosure that holds the plurality of blade computational devices. The blade enclosure may provide certain shared services, such as, power, cooling, networking, various interconnects and management services to the plurality of blade computational devices. The blade enclosure may perform many of the non-core services found in many computational devices. By locating these services in one place in the enclosure and sharing these services among the blade computational devices, the overall utilization and organization of a blade system may be more efficient in comparison to a non-blade system.

SUMMARY OF THE PREFERRED EMBODIMENTS

Provided are a method, a system, and an article of manufacture, wherein a processor blade determines whether a selected processing task is to be off-loaded to a storage blade for processing. The selected processing task is off-loaded to the storage blade via a planar bus communication path, in response to determining that the selected processing task is to be off-loaded to the storage blade. The off-loaded selected processing task is processed in the storage blade. The storage blade communicates the results of the processing of the off-loaded selected processing task to the processor blade.

In certain embodiments, the storage blade includes memory, wherein the memory of the storage blade is partitioned into a data cache that stores input/output (I/O) data requested by a processor blade processor. Additionally, the memory of the storage blade is partitioned into a communication cache that stores indicators to control communications between the processor blade and the storage blade to perform the off-loading, the processing, and the communicating.

In further embodiments, a blade system includes the processor blade and a plurality of storage blades including the storage blade. The plurality of storage blades and the processor blade are plugged into a chassis planar of the blade system. The plurality of storage blades are configured to perform I/O operations with storage devices coupled to the plurality of storage blades. A storage blade processor included in the storage blade has unused processor cycles that are utilized by off-loading the selected processing task from the processor blade to the storage blade. If the storage blade processor determines a need for I/O data that is not available from within the storage blade while processing the off-loaded selected processing task, a request for the I/O data is transmitted to the processor blade, wherein the processor blade then satisfies the request and transmits the I/O data via the planar bus communication path to the storage blade processor.

In certain embodiments, the indicators are flags, and wherein the flags set by the processor blade include at least:
a JOB_TRANSFERRING flag that indicates that the processor blade is transferring data and text of a job to the storage blade;
a JOB_TRANSFER_COMPLETE flag that indicates that an image of the job has been completely sent by the processor blade, and the storage blade may execute the job; and
a TRANSFER_RESULTS flag that indicates that the storage blade should transfer a final job image back to the processor blade.

In further embodiments, the indicators are flags, and wherein the flags set by the storage blade include at least:
a CPU_READY flag that indicates that the storage blade is idle or below a programmable threshold in processing activity such that the storage blade can feasibly accept a job from the processor blade and expect to execute the job in a reasonable number of processor cycles;
a CACHE_READY flag that indicates that there is enough available cache in the memory of the storage blade to run a processor blade job;
a JOB_PROCESSING flag that indicates that the processor blade job is currently running in the storage blade;
a JOB_PAUSE flag that indicates that the storage blade has paused execution of the job;
a JOB_COMPLETE flag that indicates that the processor blade job has completed successfully; and
an I/O_REQUEST flag that indicates that the processor blade job running on the storage blade encountered an I/O instruction that is to be processed by the processor blade.

BRIEF DESCRIPTION OF THE DRAWINGS

Referring now to the drawings in which like reference numbers represent corresponding parts throughout.

DETAILED DESCRIPTION

Figure 1:
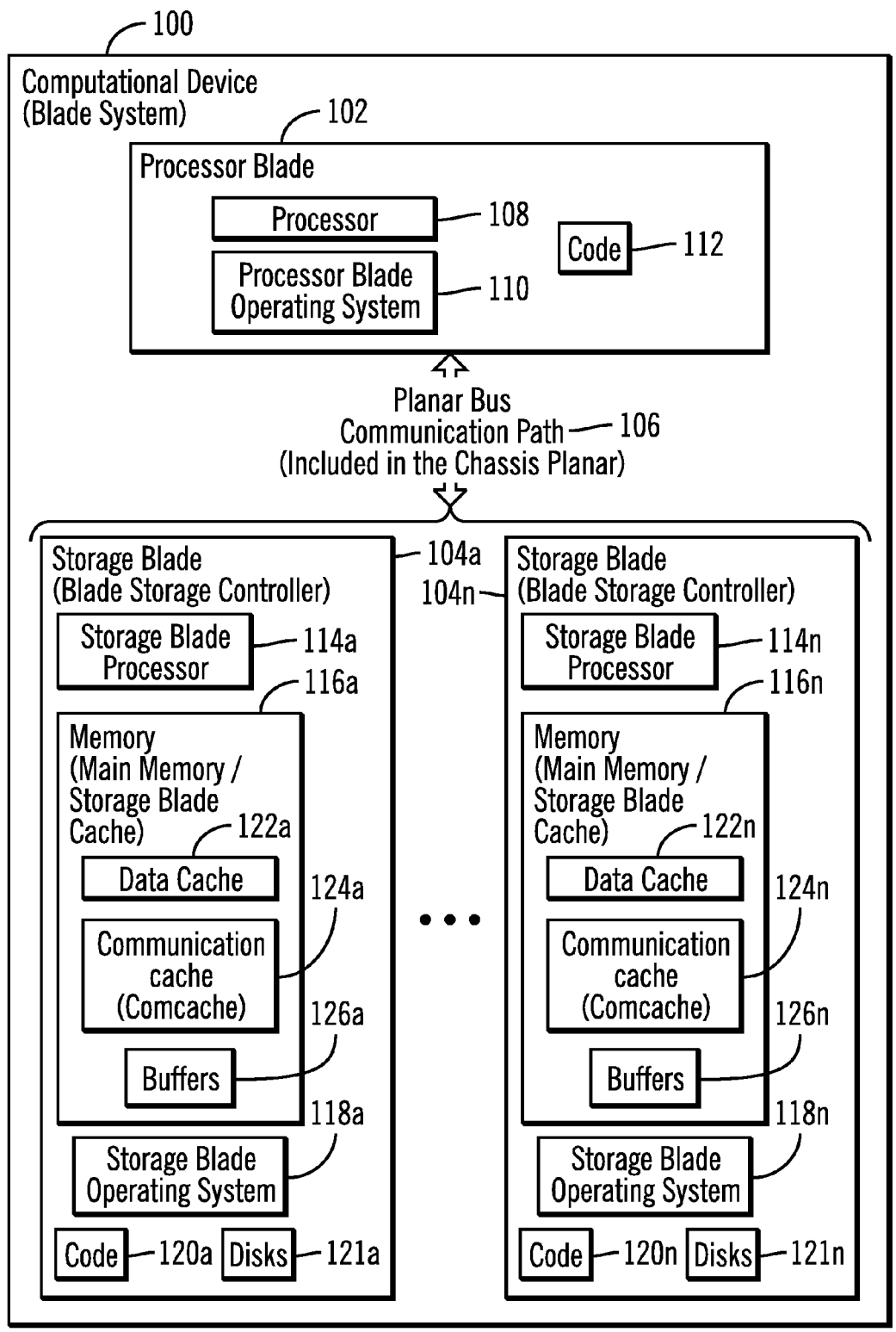
FIG. 1 illustrates a block diagram of a blade system, in accordance with certain embodiments.

In the following description, reference is made to the accompanying drawings which form a part hereof and which illustrate several embodiments. It is understood that other embodiments may be utilized and structural and operational changes may be made.

With the advent of powerful, low-cost, low-power microprocessors it may be possible to carry our more processing in less time by using an operating system executing on a storage processor. Recent trends in technology show a fast rise in microprocessor capability but a slow rise in storage media capability. This indicates a growing capability of a storage blade microprocessor to handle additional processing tasks not related to storage operations, including executing processes that have been off-loaded from a busy processor blade.

Certain embodiments off-load low priority or storage-intensive processing to one or more storage blades connected on the same blade chassis. Direct communication between a processor blade and storage blade processors is utilized for tracking and utilizing idle processors in storage blades to offload appropriate low-priority processes from the processor blade. Certain embodiments use the blade chassis backplane to manage efficiently the communication between the processor blade and the storage blades.

Certain embodiments exploit the rise in processor capabilities on the storage blades included in a blade system. Communication speed on the blade system backplane may reach an exemplary speed of 8 GB/sec, which may be higher than an exemplary speed of 1.7 GB/sec available for communication to an external storage device. This speed provides an opportunity to off-load processes from the processor blade to storage blades via the planar bus communication path on the blade system backplane.

Certain embodiments provide policies and mechanisms for:
(i) Partitioning the storage blade memory between I/O requests and offloaded processes and data;
(ii) Communicating code text and data between the processor blade and storage blade processors;
(iii) Prioritizing I/O request processing with processing of off-loaded jobs;
(iv) Handling the I/O of the off-loaded process itself;
(v) Ending off-loaded jobs when such jobs terminate or cannot be completed;
(vi) Taking advantage of the idle time of a storage blade processor;
(vii) Offloading processes in the presence of regular system I/O requests and other I/O requests;
(viii) Efficient communication policies and mechanisms between processor blade and storage blade through the backplane in a blade chassis; and
(ix) Exploiting microprocessor and operating system capabilities in the storage blade to supplement processor blade computing capabilities.

Certain embodiments use spare cycles in the storage blade to offload processor blade program execution when there is an appropriate job available. The processor blade operating system has knowledge of the storage blade processors that are available in a blade chassis or system. A path for communication between the processor blade and the storage blade processors is also provided. A protocol is provided by certain embodiments to manage this process efficiently.

In certain embodiments, when the processor blade operating system determines that a process can be off-loaded to storage blade, the processor blade operating system communicates with the storage blade processor and transmits the process code and any data to the storage blade. The storage blade executes the code and transmits the data back to processor blade. If the storage blade processor requires I/O data, the I/O request is transmitted as a request to the processor blade. The processor blade then satisfies the I/O request from the memory of the processor blade or other I/O devices and transmits the data across the backplane to the storage blade processor.

Exemplary Embodiments

FIG. 1 illustrates a block diagram of a blade system 100, in accordance with certain embodiments. The blade system 100 is a computational device that includes a processor blade 102 and a plurality of storage blades 104a . . . 104n. The plurality of storage blades 104a . . . 104n are coupled to the processor blade 102 via a planar bus communication path 106, wherein the planar bus communication path 106 is implemented in the chassis planar, i.e., the enclosure, of the blade system 100. The plurality of storage blades 104a . . . 104n and the processor blade 102 may be plugged into the chassis planar of the blade system 100. The plurality of storage blades 104a . . . 104n are configured to perform I/O operations with storage devices coupled to the plurality of storage blades 104a . . . 104n. A storage blade processor included in the storage blade has unused processor cycles that are utilized by off-loading selected processing tasks from the processor blade to the storage blade. The storage blade processors 114a . . . 114n may also be referred to as storage blade controllers.

The processor blade 102 includes a processor 108, a processor blade operating system 110, and code 112 that may be executed in the processor 108. Each storage blade includes at least a storage blade processor, a memory, a storage blade operating system, and code that may be executed by the storage blade processor. For example, storage blade 104a includes a storage blade processor 114a, a memory 116a (also referred to as main memory or storage blade cache), a storage blade operating system 118a, and code 120a that may be executed by the storage blade processor 114a, and storage blade 104n includes a storage blade processor 114n, a memory 116n, a storage blade operating system 118n, and code 120n that may be executed by the storage blade processor 114n. The storage blades 104a . . . 104n are coupled to or include storage devices such as disks. For example, storage blade 104a may include disks 121a and storage blade 104n may include disks 121n. In one exemplary embodiment, the storage blade processor 114a included in the storage blade 104a has unused processor cycles that are utilized by off-loading selected processing tasks from the processor blade 102 to the storage blade 104a. In another exemplary embodiment, the storage blade processor 114n included in the storage blade 104n has unused processor cycles that are utilized by off-loading selected processing tasks from the processor blade 102 to the storage blade 104n. The operating systems that are resident with the blade system 100 are aware of the storage blade processors that are available in the blade system 100.

In certain embodiments, the memory 116a (also referred to as main memory) of the storage blade 104a is partitioned into a data cache 122a that stores I/O data requested by the processor blade processor 108 from storage devices coupled to the storage blade 104a. Additionally, the memory 116a of the storage blade 104a is partitioned into a communication cache 124a (also referred to as a comcache) that stores indicators to control communications between the processor blade 102 and the storage blade 104a to perform at least the off-loading of processing tasks from the processor blade 102 to the storage blade 104 and the associated processing operations and communication operations.

The plurality of storage blades 104a . . . 104n are configured to perform I/O operations with storage devices 121a . . . 121n coupled to the plurality of storage blades 104a . . . 104n. A storage blade processor, such as storage blade processor 114a, included in the storage blade 104a has unused processor cycles that are utilized by off-loading a selected processing task from the processor blade 102 to the storage blade 104a. The selected processing task that is off-loaded may comprise low priority processes.

Figure 2:
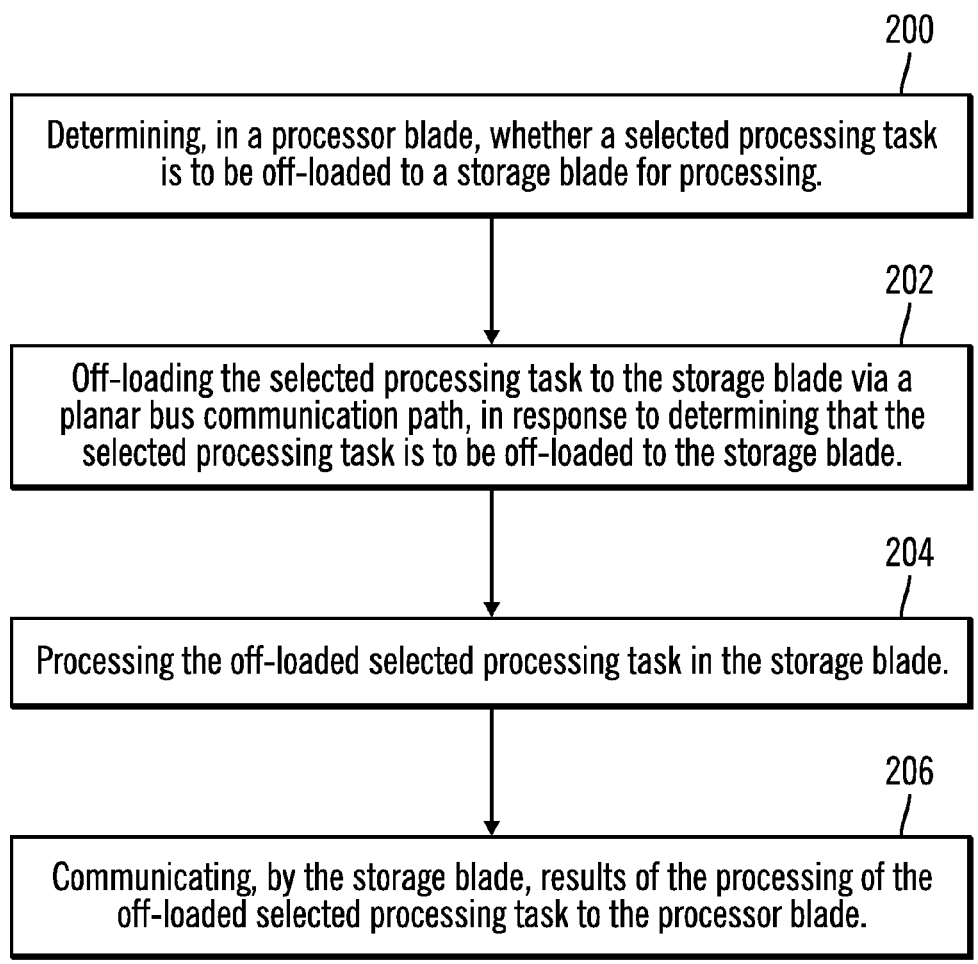
FIG. 2 illustrates a first flowchart that shows operations performed in the blade system, in accordance with certain embodiments.

FIG. 2 illustrates a first flowchart that shows operations performed in the blade system 100, in accordance with certain embodiments. The operations shown in FIG. 2 may be performed by executing the code 112 included in the processor blade 102 along with the code (e.g., code 120a and/or 120n) stored in at least one exemplary storage blade (e.g., storage blade 104a and/or 104n).

Control starts at block 200 in which the processor blade 102 determines whether a selected processing task is to be off-loaded to a storage blade (e.g., any of the storage blades 104a . . . 104n) for processing. The selected processing task is off-loaded (at block 202) to the storage blade via the planar bus communication path 106, in response to determining that the selected processing task is to be off-loaded to the storage blade. For illustrative purposes it is assumed that the selected processing task is off-loaded to the storage blade 104a. In alternative embodiments the processing task may be off-loaded to additional storage blades or to a different storage blade.

Control proceeds to block 204 in which the off-loaded selected processing task is processed in the storage blade 104a. The storage blade 104a communicates the results of the processing of the off-loaded selected processing task to the processor blade 102. In certain embodiments if the storage blade processor 114a determines a need for I/O data that is not available from within the storage blade 104a while processing the off-loaded selected processing task, a request for the I/O data is transmitted to the processor blade 102, wherein the processor blade 102 then satisfies the request and transmits the I/O data via the planar bus communication path 106 to the storage blade processor 114a.

Therefore, FIGS. 1 and 2 illustrate certain embodiments in which processing tasks are offloaded from a processor blade 102 to one or more storage blades 104a . . . 104n via a planar bus communication path 106. As a result, unused cycles in the storage blade processors 114a . . . 114n may be used to relieve processing load on the processor 108 of the processor blade 102.

Figure 3:
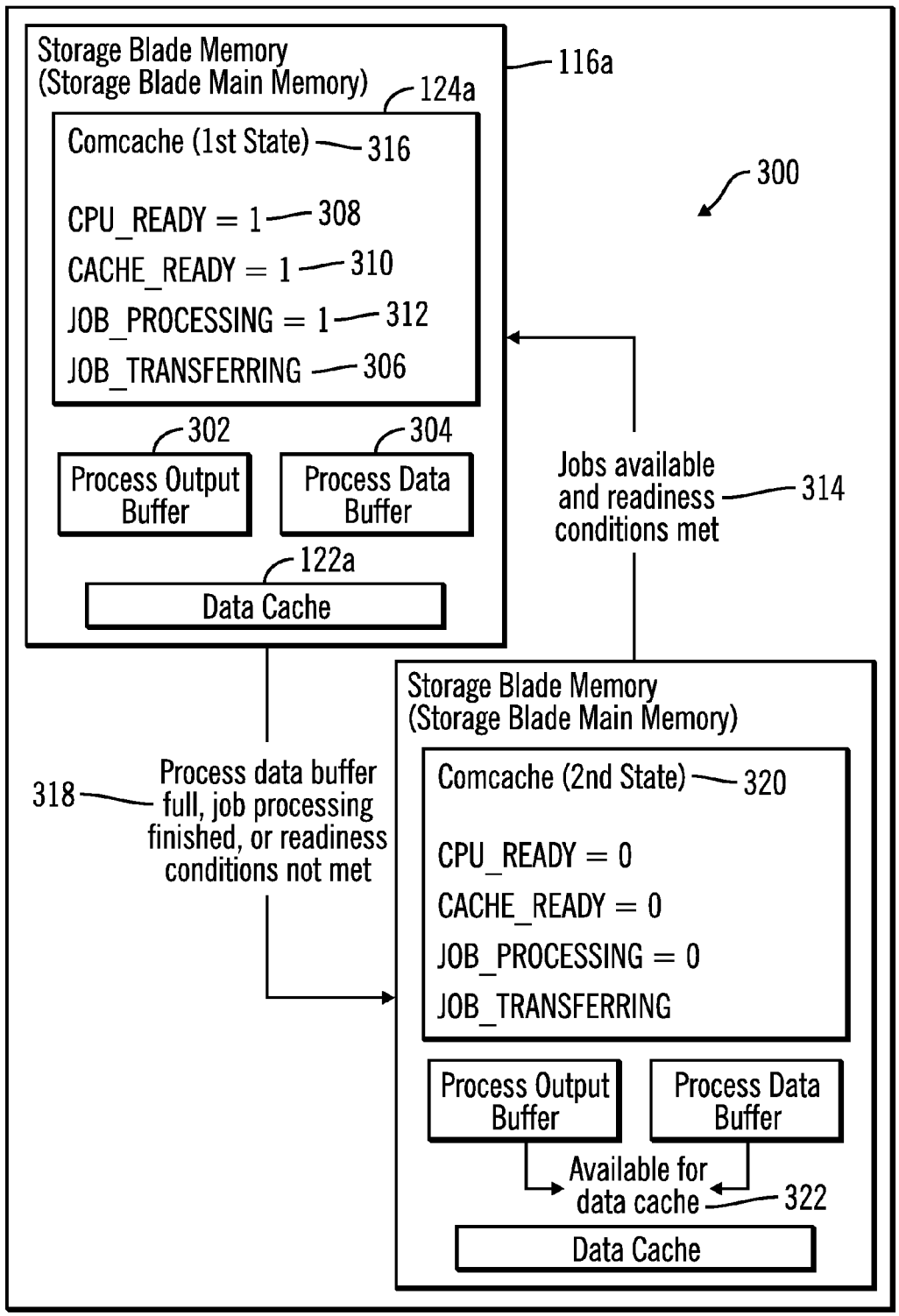
FIG. 3 illustrates a block diagram of data structures implemented in the blade system, in accordance with certain embodiments.

FIG. 3 illustrates a block diagram 300 of data structures implemented in the blade system 100, in accordance with certain embodiments. FIG. 3 shows the memory 116a of the storage blade 104a (wherein the memory 116a is referred to as the storage blade memory 116a) partitioned into a communication cache 124a (referred to as a comcache 124a), a data cache 122a, and buffers 302, 304 for holding the process data and process output. Messages are passed on the backplane between the processor blade 102 and the storage blades (e.g., storage blades 104a, 104n).

Communication processes in the processor blade operating system 110 and the storage blades 104a . . . 104n caused via the execution of the code 112, 120a . . . 120n manage communication across the chassis backplane, the sending and receiving of commands and I/O data requests. In one embodiment, the communication processes access low-level backplane signals directly to efficiently implement messaging operations. In another embodiment, the communication processes use higher-level transmission protocols to implement messages. The communication processes may use standard adapter cards and/or direct access to the transmission signals on the backplane of the blade chassis. In another embodiment, a copy service path in the blade system 100 may be used to transmit data. In yet another embodiment, the processor blade operating system 110 may be used to transmit data between the processor 108 and the blade storage comcaches 124a . . . 124n. In certain embodiments, the protocol bits are implemented as messages that are buffered and managed by the communication processes. The messages may also be encrypted for security purposes.

The comcache 124a is organized into a data area and a set of flags (the flags may be implemented as bits) for communicating status between the processor blade 102 and the storage blades 104a . . . 104n. These flags are replicated in the operating system state of the processor blade 102 and in the storage blade processor 114a and kept in synchronicity across the interface using the communication processes. The processor blade 102 may have multiple sets of flags, one for each storage blade that is available for jobs. Some of the flags associated with the storage blades 104a . . . 104n are set by the processor blade 102 and may be acted on by the storage blades 104a . . . 104n, while others are set by the storage blades 104a . . . 104n and may be acted on by the processor blade 102.

The flags that may be set by the processor blade 102 include:

(1) JOB_TRANSFERRING 306 flag: indicates that the processor blade 102 is transferring the data and text of a job to a storage blade using sequential or tagged messages on the backplane. The job may be multi-threaded if the storage blade operating system supports multi-threading. The processor blade 102 keeps track of the location memory where the image resides. The communication process on the storage blade writes the messages sequentially into the comcache as an image for the processor to execute. The JOB_TRANSFERRING 306 flag is set in response to the CPU_READY 308 and CACHE_READY 310 flags being both set by the exemplary storage blade 104a and an extant job that is to be executed.

(2) JOB_TRANSFER_COMPLETE flag: indicates that the job image has been completely sent by the processor blade 102, and the storage blade may begin processing. This flag may trail the last message that comprises the job image. The JOB_TRANSFER_COMPLETE flag is set in response to sending the last byte of the image to the storage blade.

(3) TRANSFER_RESULTS flag: indicates that the storage blade should transfer the final job image back to the processor blade 102 through sequential or tagged messages on the backplane. As the messages are received, the communication process on the processor blade 102 writes the image back to the memory where the image resides. This flag is set in response to the JOB_COMPLETE message from the storage blade.

(4) JOB_DONE flag: indicates that no job has been sent to the storage blade. It can also indicate that the latest job completed execution on the storage blade and the resulting image has been or is being written to memory, or that the job failed on the storage blade for reasons given below. This flag is set in response to a RESULTS_TRANSFER_COMPLETE or an ABORT message from the storage blade. If the ABORT message is received, the processor blade 102 executes the original image elsewhere and no image is written back to memory.

(5) I/O_REQUEST_COMPLETE flag: indicates that the prior I/O_REQUEST from the storage blade was completed and the I/O request result has been obtained. A message includes the I/O request result, including write or read status, and read data.

The flags set by the storage blade (such as any of the storage blades 104a . . . 104n) may include:

(1) CPU_READY flag 308: indicates that the storage blade is idle or below a programmable threshold in processing activity such that the storage blade can feasibly accept a job from the processor blade 102 and expect to execute the job in a reasonable number of processor cycles. If the storage blade goes not-idle due to a burst of requests or crosses the programmable threshold of I/O activity and a job is either processing or transferring in, the job activity can be aborted, (i.e. the ABORT flag sent to the processor blade 102 and the comcache 124*a* is reinitialized). The job activity may also be assigned a lower priority relative to the I/O activity. This flag is set in response to a JOB_DONE message from the processor blade 102.

(2) CACHE_READY flag 310: indicates that there is enough available cache in the storage blade memory to run a processor blade 102 job. This flag is set in response to a JOB_DONE message from the processor blade 102.

(3) JOB_PROCESSING flag 312: indicates that a processor blade 102 job is currently running in the storage blade. This flag is set in response to a JOB_TRANSFER_COMPLETE flag from the processor blade 102.

(4) JOB_COMPLETE flag: indicates that the job has completed successfully and result data is ready to be transferred back to the processor blade 102. This flag is set in response to the job exiting back to the storage blade operating system on completion of the job.

(5) RESULTS_TRANSFERRING flag: indicates that the job image (text and data) is being transferred back to the processor blade 102 using sequential or tagged messages. If an I/O request comes in during the time a job is being transferred in, it will either cause the transferring job to be aborted, paused, or the I/O request may be processed and serviced at a higher priority than the process transfer. This flag is set in response to a TRANSFER_RESULTS message from the processor blade 102.

(6) RESULTS_TRANSFER_COMPLETE flag: indicates that the last sequential or tagged message of the final job image has been sent back to the processor blade 102. This message may follow the last byte of the image sent to the processor blade 102. This flag is set when the last byte has been sent.

(7) JOB_PAUSE flag: indicates that the storage blade has suspended executing the job due to processing of a higher priority I/O request, is waiting on an I/O response from the processor blade 102, or for any other reason. In certain embodiments, the processor blade 102 does not respond to this message, although in other embodiments it may cause the storage blade to abort the job.

(8) ABORT flag: signals or interrupts the blade processor and indicates that the current transmitted or running job has been killed for one of several reasons:
   (a) The controller needs to service mainline I/O requests and cannot service an offloaded job even in low priority.
   (b) The CPU_READY or CACHE_READY bits are not set.
   (c) The JOB_PROCESSING bit is already set for some other processor blade 102 job.
   (d) The JOB_TRANSFERRING bit is already set for some other processor blade 102 job.
   (e) Not enough space available on the memory of the storage blade for the process text or data.
   (f) Ran out of available cache RAM during execution of the offloaded job on the stack or heap.
   (g) Offloaded job attempted operation that accesses memory outside the text, data, stack or heap available in the memory of the storage blade for offloaded processes.
   (h) Job is detected to be a thread of some other process not resident in a storage blade process table.
   (i) Job failed due to any number of segmentation, bad instruction, or other traps.

(9) I/O_REQUEST flag: indicates that the job running on the storage blade encountered an I/O instruction that may have to be processed by the processor blade 102. The storage blade then pauses (suspends) until an I/O_REQUEST_COMPLETE message is received from the processor blade 102. The request type and address are sent in the message to the processor blade 102, and the processor blade 102 services the request as a normal I/O request. The request status and data are then sent as an I/O_REQUEST_COMPLETE message back to the storage blade. In certain embodiments, this protocol is carried out even if the requested I/O is obtained from the storage device associated with this storage blade. If the request is to write data, then the I/O_REQUEST contains the write data and the I/O_REQUEST_COMPLETE message provides the status.

Other messages of increasing complexity and functionality are also possible, including allowing a storage blade processor 114*a* to directly access its own storage for local I/O requests.

As described above, I/O is handled by the processor blade 102 and the storage blade using I/O_REQUEST and I/O_COMPLETE messages. In one embodiment of the communication processes, the interface bits are organized as I/O messages to and from particular addresses with tags and data that are interpreted by the processor blade 102 and the storage blade as messages. In another embodiment, the I/O messages may be assumed to be sequential until some other message is received or the calculated amount of data is received. In another embodiment, the communication processes may buffer more data in the comcache 124*a* than requested, in anticipation of future requests.

In FIG. 3 certain transitions of the state of selected flags are shown. For example, when a job is available and readiness conditions are met (reference numeral 314) then in response to such conditions, the state of certain flags (CPU_READY, CACHE_READY, JOB_PROCESSING) are shown in a first state 316 of the comcache 124*a*. However, when the process output buffer 302 is full, the job processing is completed, or readiness conditions are not met (reference numeral 318) then in response to such conditions, the state of certain flags (CPU_READY, CACHE_READY, JOB_PROCESSING) are shown in a second state 320 of the comcache. In the second state 320 of the comcache the process output buffer and the process data buffer are both available for data caching (reference numeral 322).

Figure 4:
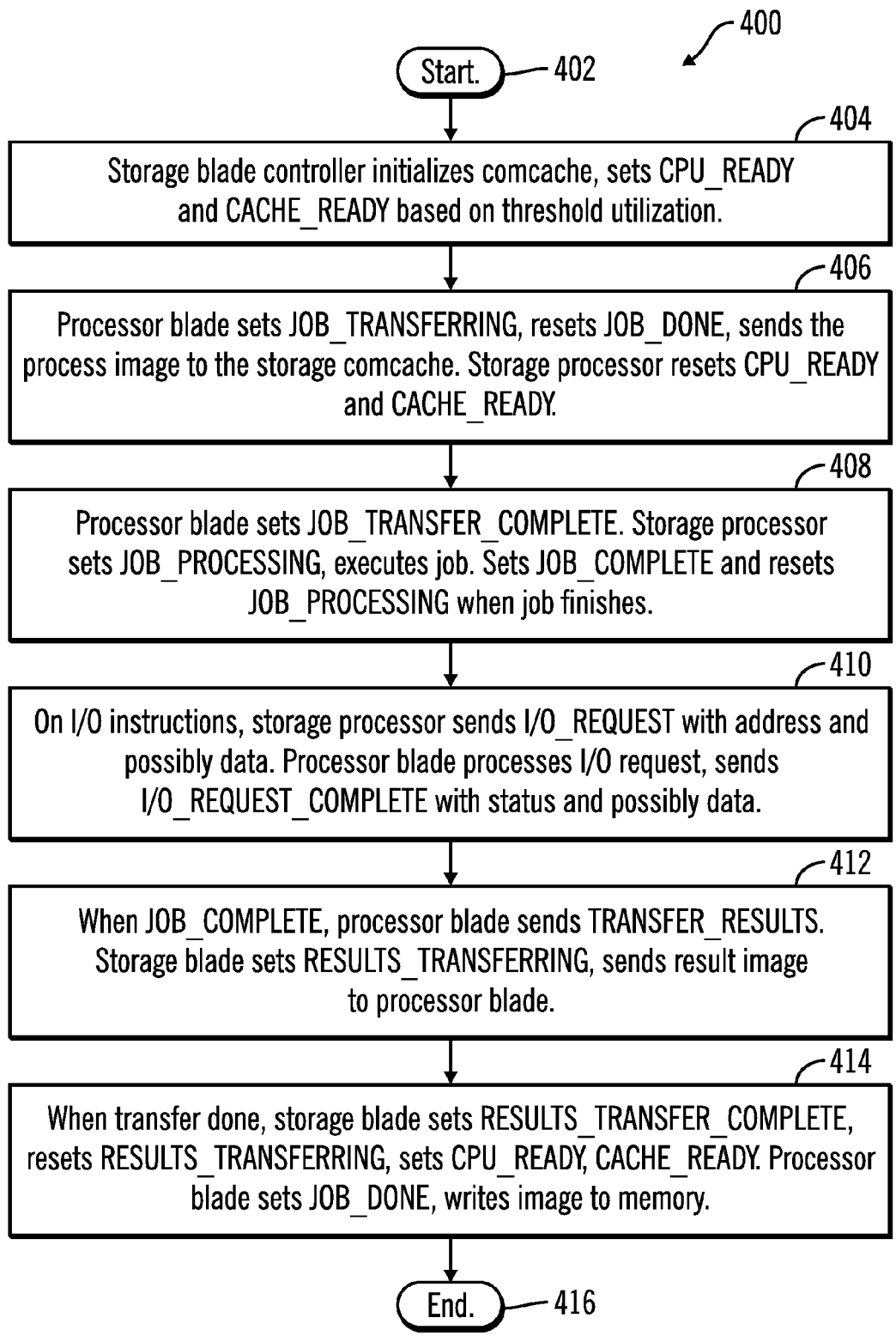
FIG. 4 illustrates a second flowchart that shows operations performed in the blade system, in accordance with certain embodiments.

FIG. 4 illustrates a second flowchart 400 that shows operations performed in the blade system 100. FIG. 4 shows an exemplary process for executing a processor blade job on a storage blade. The execution model and protocol using the flags described above are shown in FIG. 4.

The exemplary process may perform the following operations after the process is started at block 402:

(1) On initialization, the storage blade initializes (at block 404) its comcache and sets the CPU_READY and CACHE_READY flags, which are transmitted as messages across the backplane to the processor blade 102. All other flags are initialized to logic 0.

(2) When the processor blade operating system 110 determines that a low-priority process can be executed on a storage blade, the processor blade operating system 110 monitors the readiness bits from the comcache, CPU_READY and CACHE_READY. The storage blade monitors its CPU utilization and cache availability on a frequent, periodic basis. User defined and/or implementation specific thresholds for these two metrics are used as criteria for the storage blade to determine its willingness to accept jobs from the processor blade 102. When the CPU utilization falls below its threshold the CPU_READY bit is set. When the available cache memory rises above its threshold, the CACHE_READY is set.

(3) If these flags indicate the storage blade is ready, the processor blade 102 sets the JOB_TRANSFERRING flag and resets JOB_DONE if it is set. The processor blade 102 then sends the process image (code text and data) as messages to the storage blade comcache. All normal I/O requests may be delayed until the job has completed transferring, and the JOB_TRANSFER_COMPLETE flag is set for one clock tick. In response to JOB_TRANSFERRING the storage processor resets (at block 406) CPU_READY and CACHE_READY.

(4) On seeing JOB_TRANSFER_COMPLETE, the storage blade then sets the JOB_PROCESSING flag and begins executing the job, which may update data or text portions of the memory image. If an I/O instruction is encountered, the storage blade suspends and sends an I/O_REQUEST message to the processor blade 102 with a pointer to the appropriate buffer area in the comcache for any data. The processor blade 102 receives the message, services the request and returns an I/O_REQUEST_COMPLETE response. Any data that is sent by the processor blade is buffered in the comcache, and the job continues processing. When the job completes, the JOB_COMPLETE flag is set for one clock tick and at the same time the JOB_PROCESSING flag is reset by the storage blade (at blocks 408, 410).

(5) When the processor blade 102 sees the JOB_COMPLETE flag, it sends the TRANSFER_RESULTS flag, which causes the storage blade to set its RESULTS_TRANSFERRING flag and to send the image by messages to the processor blade 102 (at block 412).

(6) When the image has been sent, the storage blade sets the RESULTS_TRANSFER_COMPLETE flag for one clock tick and resets RESULTS_TRANSFERRING (at block 414).

(7) When the processor blade 102 sees the RESULTS_TRANSFER_COMPLETE flag, the processor blade 102 sets the JOB_DONE flag and writes the image data back to memory (at block 414)

(8) When the storage blade sees the JOB_DONE flag, when it is ready, it sets the CPU_READY and CACHE_READY flags and the process ends (at block 416).

During the transfer of the process to the storage blade cache, either the process will fit in the reserved space in cache, or it will be too large and the storage blade will send the ABORT signal back to the processor blade operating system 110 indicating that it cannot accept the job. The reserved memory in the storage blade cache will then be freed to be used for normal I/O requests, and the JOB_PROCESSING or JOB_TRANSFERRING bits in the comcache will be cleared.

If the process fits in the reserved space of the storage blade cache, when the process has finished transferring, the storage blade clears the JOB_TRANSFERRING bit so that normal I/O requests can be serviced if they have been delayed. The storage blade processor then executes the process. The storage blade processor may then copy the resulting process image to a buffer in another reserved portion of the cache memory. Once this output buffer is full, the output is messaged to the processor blade operating system 110, and the buffer is cleared or overwritten with another block of data from the process image. Once the process image has been completely transferred back to the processor blade, the reserved buffer memory in the storage blade cache will be freed to be used for normal I/O requests.

If a mainline storage blade I/O request occurs while the general purpose process is executing in the storage blade, to avoid deadlock the storage blade may have to service that request. A context switch must occur, and either the general purpose program is killed with an ABORT message to the processor blade or its state is saved for later completion, and the JOB_PAUSE flag may be set.

The reading and writing of data between processor memory and storage blade is relatively slow compared to on-chip processing (but efficient using the high-speed chassis backplane relative to clustering external to the chassis), and the storage blade may not be optimized for general purpose programs. However, for low-priority processes and very busy processor cores, the storage blades may increase throughput for a blade system. The blade processor may track which processes have been effectively off-loaded to the storage blade processor and utilize that knowledge in future operations.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
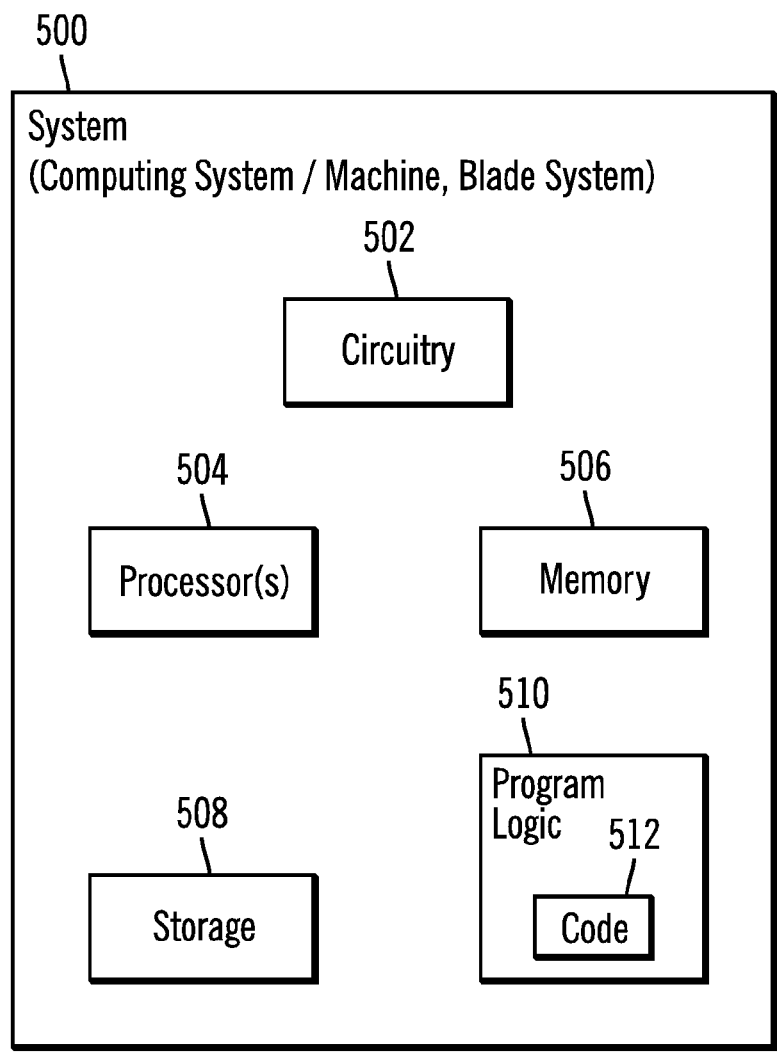
FIG. 5 illustrates a block diagram that shows certain elements that may be included in the blade system, in accordance with certain embodiments.

FIG. 5 illustrates a block diagram that shows certain elements that may be included in the blade system 100 in accordance with certain embodiments. The blade system 100 may also be referred to as a system 500, and may include a circuitry 502 that may in certain embodiments include at least a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

storing, in a storage blade, indicators that indicate whether the storage blade is idle or below a programmable threshold in processing activity and whether there is enough available cache in the storage blade for executing a job; and determining whether to off-load at least one job from a processor blade to the storage blade, based on the stored indicators, wherein selected indicators set by the processor blade indicate:

that the processor blade is transferring data and text of the at least one job of the processor blade to the storage blade;

that an image of the at least one job of the processor blade has been completely sent by the processor blade, and the storage blade may execute the at least one job of the processor blade; and that the storage blade should transfer a final job image comprising results of processing the at least one job of the processor blade back to the processor blade.

2. The method of claim 1, wherein selected indicators set by the storage blade indicate:

that the at least one job of the processor blade is currently running in the storage blade; and that the at least one job of the processor blade has completed successfully.

3. A method, comprising:
storing, in a storage blade, indicators that indicate whether the storage blade is idle or below a programmable threshold in processing activity and whether there is enough available cache in the storage blade for executing a job; and
determining whether to off-load a processor blade job from a processor blade to the storage blade, based on the stored indicators, wherein selected indicators set by the storage blade indicate:
that the processor blade job is currently running in the storage blade;
that the storage blade has paused execution of the processor blade job;
that the processor blade job has completed successfully; and
that the processor blade job running on the storage blade encountered an Input/Output (I/O) instruction that is to be processed by the processor blade.

4. The method of claim 3, wherein selected indicators set by the processor blade indicate:
that the processor blade is transferring data and text of the processor blade job to the storage blade; and
that an image of the processor blade job has been completely sent by the processor blade, and the storage blade may execute the processor blade job.

5. A blade system, comprising:
a processor blade; and
a storage blade coupled to the processor blade, wherein the blade system performs operations, the operations comprising:
storing, in the storage blade, indicators that indicate whether the storage blade is idle or below a programmable threshold in processing activity and whether there is enough available cache in the storage blade for executing a job; and
determining whether to off-load at least one job from the processor blade to the storage blade, based on the stored indicators, wherein selected indicators set by the processor blade indicate:
that the processor blade is transferring data and text of the at least one job of the processor blade to the storage blade;
that an image of the at least one job of the processor blade has been completely sent by the processor blade, and the storage blade may execute the at least one job of the processor blade; and
that the storage blade should transfer a final job image comprising results of processing the at least one job of the processor blade back to the processor blade.

6. The blade system of claim 5, wherein selected indicators set by the storage blade indicate:
that the at least one job of the processor blade is currently running in the storage blade; and
that the at least one job of the processor blade has completed successfully.

7. A blade system, comprising:
a processor blade; and
a storage blade coupled to the processor blade, wherein the blade system performs operations, the operations comprising:
storing, in the storage blade, indicators that indicate whether the storage blade is idle or below a programmable threshold in processing activity and whether there is enough available cache in the storage blade for executing a job; and
determining whether to off-load a processor blade job from the processor blade to the storage blade, based on the stored indicators, wherein selected indicators set by the storage blade indicate:
that the processor blade job is currently running in the storage blade;
that the storage blade has paused execution of the processor blade job;
that the processor blade job has completed successfully; and
that the processor blade job running on the storage blade encountered an Input/Output (I/O) instruction that is to be processed by the processor blade.

8. The blade system of claim 7, wherein selected indicators set by the processor blade indicate:
that the processor blade is transferring data and text of the processor blade job to the storage blade; and
that an image of the processor blade job has been completely sent by the processor blade, and the storage blade may execute the processor blade job.

9. A computer readable storage medium implemented in hardware, wherein computer readable program code stored in the computer readable storage medium causes operations when executed by a blade system having a processor blade and a storage blade, the operations comprising:
storing, in the storage blade, indicators that indicate whether the storage blade is idle or below a programmable threshold in processing activity and whether there is enough available cache in the storage blade for executing a job; and
determining whether to off-load at least one job from the processor blade to the storage blade, based on the stored indicators, wherein selected indicators set by the processor blade indicate:
that the processor blade is transferring data and text of the at least one job of the processor blade to the storage blade;
that an image of the at least one job of the processor blade has been completely sent by the processor blade, and the storage blade may execute the at least one job of the processor blade; and
that the storage blade should transfer a final job image comprising results of processing the at least one job of the processor blade back to the processor blade.

10. The computer readable storage medium of claim 9, wherein selected indicators set by the storage blade indicate:
that the at least one job of the processor blade is currently running in the storage blade; and
that the at least one job of the processor blade has completed successfully.

11. A computer readable storage medium implemented in hardware, wherein computer readable program code stored in the computer readable storage medium causes operations when executed by a blade system having a processor blade and a storage blade, the operations comprising:
storing, in the storage blade, indicators that indicate whether the storage blade is idle or below a programmable threshold in processing activity and whether there is enough available cache in the storage blade for executing a job; and
determining whether to off-load a processor blade job from the processor blade to the storage blade, based on the stored indicators, wherein selected indicators set by the storage blade indicate:

that the processor blade job is currently running in the storage blade;

that the storage blade has paused execution of the processor blade job;

that the processor blade job has completed successfully; and that the processor blade job running on the storage blade encountered an Input/Output (I/O) instruction that is to be processed by the processor blade.

12. The computer readable storage medium of claim 11, wherein selected indicators set by the processor blade indicate:

that the processor blade is transferring data and text of the processor blade job to the storage blade; and that an image of the processor blade job has been completely sent by the processor blade, and the storage blade may execute the processor blade job.

13. A system, comprising:

a memory; and a processor coupled to the memory, wherein the processor performs operations, the operations comprising:

storing, in a storage blade, indicators that indicate whether the storage blade is idle or below a programmable threshold in processing activity and whether there is enough available cache in the storage blade for executing a job; and determining whether to off-load at least one job from a processor blade to the storage blade, based on the stored indicators, wherein selected indicators set by the processor blade indicate:

that the processor blade is transferring data and text of the at least one job of the processor blade to the storage blade;

that an image of the at least one job of the processor blade has been completely sent by the processor blade, and the storage blade may execute the at least one job of the processor blade; and that the storage blade should transfer a final job image comprising results of processing the at least one job of the processor blade back to the processor blade.

14. The system of claim 13, wherein selected indicators set by the storage blade indicate:

that the at least one job of the processor blade is currently running in the storage blade; and that the at least one job of the processor blade has completed successfully.

15. A system, comprising:

a memory; and a processor coupled to the memory, wherein the processor performs operations, the operations comprising:

storing, in a storage blade, indicators that indicate whether the storage blade is idle or below a programmable threshold in processing activity and whether there is enough available cache in the storage blade for executing a job; and determining whether to off-load a processor blade job from a processor blade to the storage blade, based on the stored indicators, wherein selected indicators set by the storage blade indicate:

that the processor blade job is currently running in the storage blade;

that the storage blade has paused execution of the processor blade job;

that the processor blade job has completed successfully; and that the processor blade job running on the storage blade encountered an Input/Output (I/O) instruction that is to be processed by the processor blade.

16. The system of claim 15, wherein selected indicators set by the processor blade indicate:

that the processor blade is transferring data and text of the processor blade job to the storage blade; and that an image of the processor blade job has been completely sent by the processor blade, and the storage blade may execute the processor blade job.

* * * * *